United States Patent
Thomas, III et al.

(10) Patent No.: US 11,429,201 B2
(45) Date of Patent: Aug. 30, 2022

(54) SURFACES WITH INFORMATION MARKS

(71) Applicant: Hewlett-Packard Development Company, L.P., Spring, TX (US)

(72) Inventors: Fred Charles Thomas, III, Fort Collins, CO (US); Derek Lukasik, Fort Collins, CO (US); Guy Adams, Bristol (GB)

(73) Assignee: Hewlett-Packard Development Company, L.P., Spring, TX (US)

(*) Notice: Subject to any disclaimer, the term of this patent is extended or adjusted under 35 U.S.C. 154(b) by 9 days.

(21) Appl. No.: 16/970,737

(22) PCT Filed: Apr. 13, 2018

(86) PCT No.: PCT/US2018/027545
§ 371 (c)(1),
(2) Date: Aug. 18, 2020

(87) PCT Pub. No.: WO2019/199324
PCT Pub. Date: Oct. 17, 2019

(65) Prior Publication Data
US 2021/0089140 A1    Mar. 25, 2021

(51) Int. Cl.
*G06F 3/03* (2006.01)
*G06F 3/0354* (2013.01)
*G06F 3/038* (2013.01)

(52) U.S. Cl.
CPC .......... *G06F 3/0317* (2013.01); *G06F 3/0383* (2013.01); *G06F 3/0386* (2013.01); *G06F 3/03542* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,064,586 | A * | 5/2000 | Snyder | G11B 7/0065 |
| 7,422,154 | B2 * | 9/2008 | Ericson | G06V 10/17 |
| | | | | 235/462.11 |
| 7,604,182 | B2 | 10/2009 | Lapstun et al. | |
| 7,694,889 | B2 * | 4/2010 | Sonoda | G06K 17/0032 |
| | | | | 235/494 |
| 8,286,890 | B2 * | 10/2012 | Lapstun | G06F 3/1265 |
| | | | | 235/494 |
| 9,170,660 | B2 | 10/2015 | Takeda | |
| 11,049,349 | B2 * | 6/2021 | Onischuk | G07C 13/00 |

(Continued)

FOREIGN PATENT DOCUMENTS

| | | |
|---|---|---|
| CN | 1309346 | 8/2001 |
| CN | 104007846 | 8/2014 |
| EP | 1605341 | 6/2015 |

*Primary Examiner* — Calvin C Ma
(74) *Attorney, Agent, or Firm* — Fabian VanCott (57) ABSTRACT

A surface including: multiple data pages, wherein each data page includes: multiple optically detectable marks indicating boundaries of the data page; and an array of data cells, wherein a location of an optically detectable mark in a data cell of the array of data cells encodes information and adjacent data pages use different encoding patterns such that an encoded value would be represented by a first pattern of marks on a first data page and the same encoded value would be represented by a second, different pattern of marks on a second data page.

20 Claims, 4 Drawing Sheets

(56) References Cited

U.S. PATENT DOCUMENTS

| | | | |
|---|---|---|---|
| 2004/0173687 A1* | 9/2004 | Lapstun | G06K 19/06037 |
| | | | 235/494 |
| 2004/0212848 A1 | 10/2004 | Lapstun et al. | |
| 2008/0088886 A1 | 4/2008 | Silverbrook et al. | |
| 2008/0134101 A1 | 6/2008 | Newman | |
| 2009/0115744 A1 | 5/2009 | Zhang et al. | |

* cited by examiner

SURFACES WITH INFORMATION MARKS

BACKGROUND

People learn to use pens and/or pencils for writing, drawing, creating documents, etc. as part of their education. Electronic devices have struggled to compete with the simplicity, reliability, and cost of a pen and paper.

Writing systems with surfaces containing embedded information provide features not found in other systems. For example, watermarks have been used to identify the source of a document. Similarly, embedded information in currency surfaces and substrates helps prevent counterfeiting. In some cases, the embedded information is readily accessible to a user. In other cases, the embedded information uses specialized equipment to detect.

Some writing surfaces include marks to aid their use. Children learn to write using paper ruled with three-line patterns to aid in forming letters of the proper proportions. Engineering paper includes grids to aid in drawing shapes.

BRIEF DESCRIPTION OF THE DRAWINGS

The accompanying drawings illustrate various examples of the principles described herein and are a part of the specification. The illustrated examples do not limit the scope of the claims.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

DETAILED DESCRIPTION

This specification describes surfaces containing positionally embedded or encoded information. Embedding information (positionally encoding) in a surface may be used to provide a variety of benefits. The embedded information may include document information, page information, error correction, and/or location on the page information. Page here may refer to a physical sheet of media and/or an electronic display, for example, a tablet, a smartphone, and/or a desktop display. The electronic display may display coordinates of the display screen. The electronic display may display the coordinates of the portion of the document being displayed on the relevant part of the screen. The embedded information may include security features, watermarks, encrypted information, and/or decryption keys for information. In an example, the information includes a web location and a password to access a digitally stored copy of a physical document. The information may include decryption keys and/or other security features. In an example, the embedded information includes a user identification and/or the user account used to access and/or print the associated document.

The surface may be printed media, for example, paper printed with an inkjet and/or similar low resolution printer. The surface may be media printed with other printing processes, especially those capable of higher resolutions. The surface may be an overlay. An overlay is a layer of material that is put over and/or under another layer, for example, under a surface of an electronic display. An overlay may be added afterwards to a display of an electronic device, for example, as a polymer film applied to the top of the electronic display. An overlay may be applied to a drawing surface, a mouse pad, a desktop, and/or another non-display surface. The overlay may be produced using offset, flexographic and/or other higher resolution printing techniques allowing higher densities of information to be embedded and/or encoded in the surface. The longer use life of the overlay compared to a printed document may support higher printing costs. The surface may be a display using the pixels of the display. For example, a surface of a display may encode the relative position of a displayed document in an area of the display and/or an absolute position relative to the display itself. The amount of information that can be embedded per mark facilitates a wide variety of uses.

One challenge with embedded patterns is the tendency to produce fixed pattern noise. Fixed pattern noise may include Moiré noise, Fixed pattern noise may occur when a surface with marks having constant separations is imaged with a camera with discrete pixels. A stylus with higher resolution (which would avoid the fixed pattern noise), could use smaller marks and store more data per unit area. A stylus with a higher resolution also increases the file size of the image and the computational cost of the image processing calculations. These factors push the mark size and the stylus resolution towards each other.

In surfaces with embedded patterns, it may be useful to repeat information in adjacent data pages. For example, the data pages may each include a document number, a page number, a reference number, a column number, a row number, and/or similar information. In an example, all the embedded information that changes between two adjacent data pages is one of a column value and/or a row value. If the adjacent data pages use the same encoding of the information, then the mark pattern on the adjacent pages may be very similar with a data cell and any parity cells varying and the other cells being the same between the adjacent data pages. This can produce periodic marks on the surface that produce fixed pattern noise.

Varying the mark pattern on the surface while indicating the same value after decoding by the stylus provides a way to reduce the fixed pattern noise. Specifically, the information is encoded such that mark-to-mark spacing is non-repeating, reducing the occurrence of fixed pattern noise from marks on the surface and in the case of a patterned film overlay on a display, reducing the beat pattern generation between display pixels and the patterned film or Moiré interference noise pattern. This can be achieved in a number of different ways.

This specification uses the term "conjugate transform" to describe changing a value to be stored in marks on a surface to a different value to reduce fixed pattern noise. After the value of the data cell is determined, a "conjugate inverse-transform" is performed to determine the value stored in the data cell. So a number WXYZ may first be conjugate transformed into a conjugate transformed number ARCD, The conjugate transformed number is then encoded based on an encoding pattern into marks on the surface. Later, a camera acquires an image of the surface. The encoding pattern is used to decode the conjugate transformed number (ABCD) from the marks on the surface. The conjugate transformed number is then conjugate inverse-transformed to provide the desired value (WXYZ). The use of the conjugate transform and conjugate inverse-transform may be used with or without variation of the encoding pattern on the surface.

For example, a digit with a value of 2 may be conjugate transformed into either 6 or 9 but the conjugate inverse-transform for 6 will be 2 and the conjugate inverse-transform for 9 will also be 2. Whether to use 6 or 9 may depend on the other marks encoded on the surface so as to minimize noise. One can think of this like using multiple different values to represent frequent values in a substitution cypher. In a substitution cypher, two different values, e.g., 15 and 37 may both represent a letter "e" and the decision to use 15 vs. 37 may be selected based on factors other than the value being represented. In a substitution cypher, the purpose of having multiple possible transformed values is to avoid providing frequency information to aid in decoding. Here, multiple transformed values allow flexibility to avoid mark patterns on the surface which produce fixed pattern noise. The system need not use multiple representations for a given digit. In an example, the conjugate transform and conjugate inverse-transform operations provide 1:1 reversible relationships between the untransformed values and the transformed values.

In an example, the information is conjugate transformed prior to encoding in the surface. As used in this specification and the associated claims, a conjugate transformed number may be subjected to a mathematical operation (conjugate inverse-transform) to produce the embedded information. The conjugate inverse-transform operation impacts the values of many of the digits of the number. In some cases, the conjugate inverse-transform operation changes the values of most of the digits of the number. In some cases, the conjugate inverse-transform operation changes all the digits of the number. The conjugate inverse-transform operation may be defined by an equation. The conjugate inverse-transform operation may be defined by a table. The number and its conjugate transform may have a 1:1 relationship, allowing the number to be conjugate transformed and encoded and then read and conjugate inverse-transformed to extract the original value. There may be multiple conjugate transforms which yield the same value when conjugate inverse-transformed. Selecting between the multiple conjugate transforms may be performed to minimize the fixed pattern noise. In contrast, the conjugate-inverse transform provides a specific value for each possible transformed value which may be represented by mark patterns on the surface.

The use of a conjugate transform allows systems to use knowledge of which portions of the embedded information are changing rapidly, e.g. least-significant digit(s), and which portions are changing slowly and/or not at all, e.g., most-significant digit(s). While a large number of conjugate transforms can be readily imagined, some examples are presented here to illustrate.

Consider an example set of four digits, each represented by a letter, WXYZ, W being the most-significant digit and Z being the least-significant digit. A conjugate transform might be to perform modular addition of Z to each other digit so that the conjugate transformed digits were (W+Z)(X+Z)(Y+Z)(Z), The base used may be the same as the number of states available to a data cell. For example, if there are 9 positions for a mark in a given data cell, the data cell may represent the numbers 1-9. To conjugate transform the number 4436 using this particular conjugate transform, the result would be (4+6)(4+6)(3+6)(6), performing the modular simplification produces the value 1196 which could then be encoded in the data page. Incrementing the stored value to 4437, the conjugate transform produces (4+7)(4+7)(3+7)(7), which simplifies in mod 9 to 2217. Even though the values have incremented by one in the least-significant digit, the conjugate transformed values of 1196 and 2217 do not have the same value in any position. Further, the conjugate transformation can be readily reversed. So reversing the first conjugate transformed series by subjecting the least-significant digit (modularly) from each digit produces (1−6)(1−6)(9−6)(6) which simplifies to 4436, the original value. It may be helpful to select a conjugate transform and/or conjugate inverse-transform operation which does not change the value of digits used to calculate the conjugate transform. Such digits may include digits which naturally vary over the surface, such as control digits, position digits, parity digits, etc.

In an example, values of zero and/or one may be encoded as a blank data cell. Leading zeros and/or ones often have a higher prevalence in cumulative numbers than other values. Accordingly, the conjugate transform not changing these values may preserve the number of blank data cells and minimize the number of marks on the surface.

Consider a conjugate transform that uses the following rules for each digit except the least-significant digit. If value of the digit is 0, then conjugate transformed value of the digit remains 0. If the value of the digit is 1−6, add the value of the least-significant digit and subtract 3 from the digit modular 6. In this example, we will use a 5×5 array of data cells in a data page, each data page containing a digit from 0 to 6, for example by having a 2×3 array of positions in the data cell. For a hypothetical number of 00000 00056 00000 00302 00125 the conjugate transform becomes 00000 000(5+5−3)(5+6−3) 00000 00(3+5−3)0(2+5−3) 00(1+5−3)(2+5−3)5 which simplifies to 00000 00012 00000 00504 00345.

Conjugate transforming and conjugate inverse-transforming may be combined with the other approaches described in this specification. Addition and subtraction allow determination of the original value because we know the original value is within the states assignable to the digit. This is true even if the addition and subtraction are based on multiple digits. For example, one could add the product of the least-significant digit of an X position and the least-significant digit of a Y position. Here the multiplication determines a value that is then linearly combined with the value.

The conjugate transform may also include swapping digits. For example, WXYZ may be conjugate transformed to ZXWY. Such swaps may be performed with and/or without an addition and/or subtraction to the digits. In an example, WXYZ may be conjugate transformed to (X+Z)(W+Y)(Y+Z)(Z+1).

The conjugate inverse-transforming the most-significant digit of the series of digits may combine the most-significant conjugate transformed digit and the least-significant conjugate transformed digit. As discussed above, using a digit which changes frequently to modify the encoded digits which do not change frequently provides a way to avoid repetition of the marks representing the digits which do not change frequently. This reduces the instances of groups of marks having periodic separations which can cause fixed pattern noise.

The conjugate transform may be a lookup table. The lookup table for the conjugate transform and/or the conjugate inverse-transform may be stored as arrays of values.

Another approach to reducing equal mark-to-mark spacing on a surface varies the encoding patterns used to encode the values into the marks for portions of and/or all of different pages. For example, a first data page may encode data cells having a 3×3 array of positions defined as shown below.

(1, 2, 3)
(4, 5, 6)
(7, 8, 9)

The adjacent data page may use a different 3×3 array of encoding positions, for example, rotating the array by 90 degrees clockwise.

(7, 4, 1)
(8, 5, 2)
(9, 6, 3)

An adjacent page may use another pattern, for example, one that doesn't keep the 5 in the center position.

(8, 3, 6)
(2, 1, 4)
(9, 7, 5)

In an example, the encoding pattern may vary in a deterministic way between adjacent pages. For example, a line of adjacent pages may use the following patterns.

| | | |
|---|---|---|
| (1, 2, 3) | (9, 1, 2) | (8, 9, 1) |
| (4, 5, 6) | (3, 4, 5) | (2, 3, 4) |
| (7, 8, 9) | (6, 7, 8) | (5, 6, 7) |

Reducing the keeping of digits in the same row and/or column between adjacent data pages may reduce groups of marks with the same spacing which give rise to fixed pattern noise.

| | |
|---|---|
| (1, 2, 3) | (4, 9, 8) |
| (4, 5, 6) | (3, 1, 7) |
| (7, 8, 9) | (2, 6, 5) |

The arrangement of encoding patterns may be indicated by a mark and/or marks in the data page. In an example, the data page includes an orientation figure which indicates the "up" edge of the data page. A surface may use different orientation figures in different data pages to indicate the encoding pattern used. In some cases, the captured field of view of the camera does not reliably acquire more than a single data page under all orientations and/or conditions. If the field of view reliably captures adjacent data pages, then information in adjacent data pages may be used to indicate information needed to extract the contents of a data page.

The data page includes multiple marks that indicate the boundaries of the data page. These marks may also be used to indicate the encoding pattern for a data page. For example, a data page may include four corner marks and a mark centered between the two corner marks at the "top" of the data page. This mark could also indicate the top of the adjacent page. The orientations of the two adjacent pages would then be rotated 180 degrees from each other. Paired pages could then be repeated across the surface to produce a chessboard pattern of orientations.

Instead of centering the mark between the two corner marks, the mark may be offset to one side. For example, the mark could be placed ¼, ⅓, and/or ½ of the way between the two corner marks. These could each be used to convey a different encoding pattern. The corner marks can readily have up to 20 or more discrete locations between them that could be used to indicate the encoding pattern for the adjacent data page or data pages.

The boundary determining marks may be located at positions besides the corners. The boundary determining marks may be located along the sides of the data page. In an example, each side is defined by two marks and the spacing between them is used to encode information, such as the encoding pattern used. The boundary determining marks may be located at the centers sides of the data page. If the data page is square and/or rectangular, this provides four marks with equal separations which may be useful for identifying the boundary determining marks. The boundary determining marks may use multiple marks to indicate a side. The variety of different ways to implement boundary marks for the data page provides a way to indicate the encoding pattern for the associated data page.

In an example, the encoding pattern is selected based on the adjacent data page to minimize repeated mark-to-mark separations. For example, if there are multiple encoding patterns, the system may look at the adjacent data pages and selects the pattern least likely to produce fixed pattern noise. The encoding patterns can be randomly assigned to each data page on the surface and then a check made for areas were the repeated marks may cause fixed pattern noise. The encoding patterns may be determined in order across the surface using the previously determined data pages to limit the options for the next data page. The allowed positions for the marks in the data page may be filtered based on the adjacent data page(s).

The information used to indicate the encoding pattern for the rest of the data page may be encoded with a fixed encoding pattern. For example, if a data cell or data cells are understood to change so as to avoid fixed pattern noise, then the use of a fixed encoding with those cells does not present the same risk of fixed pattern noise. In an example, the least-significant digits of the information stored in the data page are encoded with a first encoding pattern on all the data pages. The rest of the data cells are encoded based on the value of the least-significant digit. So to extract the information from the data page, a system identifies the data page, identifies the data cell holding the least-significant digit, extracts the value of the least-significant digit using a fixed encoding pattern, uses the least-significant digit to determine which encoding pattern is used for the other data cells of the data page, and then extracts the values of the other data cells using the encoding pattern determined by the value of the least-significant digit.

Multiple digits may be encoded with the fixed encoding pattern in data cells. The digits with fixed encoding may also hold additional information, for example, parity digits and least-significant and/or less-significant digits. The digits with fixed encoding may just encode the encoding pattern for the other data cells of the data page. There is a tradeoff between flexibility and storage in using the fixed digits to hold information beyond the encoding pattern designation.

Other mechanisms are also within the scope of this disclosure. For example, the encoding for the data cells may be daisy chained based on the stored value of the previous data cell. This provides additional variation of the encoding pattern within the data page.

The surface includes a pattern which is used to embed and/or encode information. The surfaced pattern may be formed by marks. In an example, the marks are dots. The marks may have a circular shape. The marks may have a roughly square shape. In an example, the marks are formed by an X by Y set of droplets from a printing system. For example, the mark may be a 2×2 figure formed by four droplets from an inkjet printer. The marks may be marks with the same size in the X and Y axes. Smaller marks may be used with a system which does not encode information into the shape of the mark; instead the system determines the presence and/or absence of a mark at a location relative to a reference grid.

The use of asymmetrical marks, e.g., 2×4 and 4×2 may encode more information per mark but may also use larger marks to reliably extract the information embedded in the mark. Further, larger marks may be more noticeable and/or distracting on the surface compared with a similar density of markings separated from each other. Shape based information in the marks may render the marks more vulnerable to jet failures, defects, and/or dead pixels in a surface. In contrast, a 2×2 and/or 3×3 square and/or circular marks includes redundancy and robustness compared with single droplet and/or single pixel marks.

Finally, the system may use a set of 2×3 marks and/or similar where individual marks are treated as marks (i.e., conveying binary present/absent information) but the overall orientation of the marks is used to provide orientation information. For example, all the marks may be oriented in a major axis in X and a minor axis in Y (e.g., a 2×3 droplets and/or 2×3 pixels mark). The marks may be oriented to point to the nearest grid mark. A system may include a check for secondary encoding in the mark.

Letters, symbols, characters, etc. may encode information by the relative positions of the dark regions to each other, forming their characteristic shape. Information can also be conveyed by the position of the symbol relative to another. Hence in "1.0" and "10." the relative positions of the 1 and 0 relative to the period conveys information about the power of the value represented. In an encoding scheme, instead of using symbols such as 1 and 0, the information is embedded partially and/or completely based on position of the marks. As mentioned above, this reduces the resolution to assess the marks and allows the use of smaller marks.

Like the other tradeoffs, inclusion of more marks in a given area has consequences. More marks may result in a darker surface. More marks may result in less spacing between marks. Accordingly, it may be useful to limit the number of marks in an area of the surface to a single mark. It may be useful to limit the number of marks in an area of the surface to two marks. It may be useful to limit the number of marks in an area to certain one and two mark permutations, for example, prohibiting marks from being in adjacent portions of the space.

Some encoding patterns include control information. In an example, control information is a rectangular grid, with a control mark at regular intervals of X and Y. The intervals in X and Y may be equal such that the grid is a square grid. The intervals in X and Y may be unequal such that the grid is a rectangular grid, e.g., 4×5 units such that the spacing in X and Y provides orientation information.

The encoding patterns may use control marks to define data pages. For example, an encoding pattern may include a page definition mark as an example of a control mark. The page definition marks may indicate the boundaries of a data page. The page definition marks may be located at the corners of the data page. Control marks may also be used to indicate an encoding pattern and/or an orientation of the data page. For example, a data page may use three page definition marks at three of four corners of the data page, the fourth corner being used to indicate an "upper left" orientation for the data page. Control marks may be located along an edge of a data page. For Example, a data page may be defined by four control marks located near the corners of the date page. Orientation may be defined by a control mark halfway between two corners, to indicate an "up" orientation for the data page.

In this specification and the associated claims, the area defined by page definition marks is called a data page. A data page contains an array of data cells. For example, a data page may contain a 5×5 array of data cells. Each data cell may contain a data mark located at a position in the data cell to indicate a value. A data cell may contain no data marks. A data cell may contain multiple data marks.

Using a 300 dot per inch (dpi) printer, with marks of 2×2 dots (84.3 µm radius per dot), a data page having a 5×5 array of data cells may be approximately 2.54 mm$^2$ in size. For a standard 8.5×11" piece of paper, this corresponds to over 23,000 5×5 data pages per sheet of paper. Assuming, 10% is reserved for control, error correction, etc., the marks on a single sheet of paper could store just over half a million 0-9 (i.e., base 10) digits of information on what is visually nearly a blank page.

As used in this specification and the associated claims, a surface is a non-uniform structure that is accessible from the environment on at least one side. A surface may be a sheet of paper. A surface may be a curved plastic body. A surface may be a screen where the non-uniformity is provided by differences in absorbance of material which is not physically exposed to the environment but still visible from the environment. A surface may be physically non-uniform and/or have a variety of states in a similar physical structure. A surface may be formed during additive manufacture of a component.

As used in this specification and the associated claims, visually detectable marks include marks that are detectable with the use of a camera and/or using magnification in addition to marks detectable with the unaided eye. In many examples, the marks are quite small and difficult to see with an unaided eye. In some implementations, the marks are produced with materials (inks, etc.) that are invisible to the unaided human eye, while visible to the camera.

Minimizing the visual impact of the marks may also be achieved by making the marks visible under ultraviolet (UV) and/or infrared (IR) light in addition to and/or instead of visible light. Infrared light is lower energy, can be produced readily with a light emitting diode (LED) and doesn't present the same health risks as UV, making IR a good choice for some implementations. The use of black toner and/or ink deposited using a printer avoids having to stock a specialized material for making the visually detectable marks. Specialty inks which are designed to have high contrast and/or visibility to a camera in a selected irradiance band, such as the previously mentioned UV and/or IR irradiance bands, are a good choice for some implementations. Finally, elements of printed material that may be difficult to see on their own, such as uncolored polymers (e.g., latex) or diffuse nano-structures may be readily visible using a camera capable of detecting wavelengths outside the visible spectrum.

Among other examples, this specification describes. A surface including: multiple data pages, wherein each data page includes: multiple optically detectable marks indicating boundaries of the data page; and an array of data cells, wherein a location of an optically detectable mark in a data cell of the array of data cells encodes information and adjacent data pages use different encoding patterns such that an encoded value would be represented by a first pattern of marks on a first data page and the same encoded value would be represented by a second, different pattern of marks on a second data page.

Among other examples, this specification also describes a surface including: multiple data pages, each data page encoding an encoded series of digits having a most-significant digit and a least-significant digit, each data page including: multiple marks indicating boundaries of the data page, and an array of data cells, each data cell indicating a digit of a series of conjugate transformed digits based on a position of a mark relative to the data cell; wherein conjugate inverse-transforming the series of conjugate transformed digits produces the encoded series of digits.

This specification also describes a stylus, wherein the stylus includes: a processor; a memory associatively coupled with the processor; and a camera directed to a surface beneath a tip of the stylus, wherein, when processing instructions in the memory, the processor: receives an image/s of a surface from the camera/s; determines a location of a data page in the image; determines a value of a code based on a position of an optically detectable mark relative to the data page; and determines the values of data cells in the data page based on the value of the code and positions of optically detectable marks on the data page.

Figure 1:
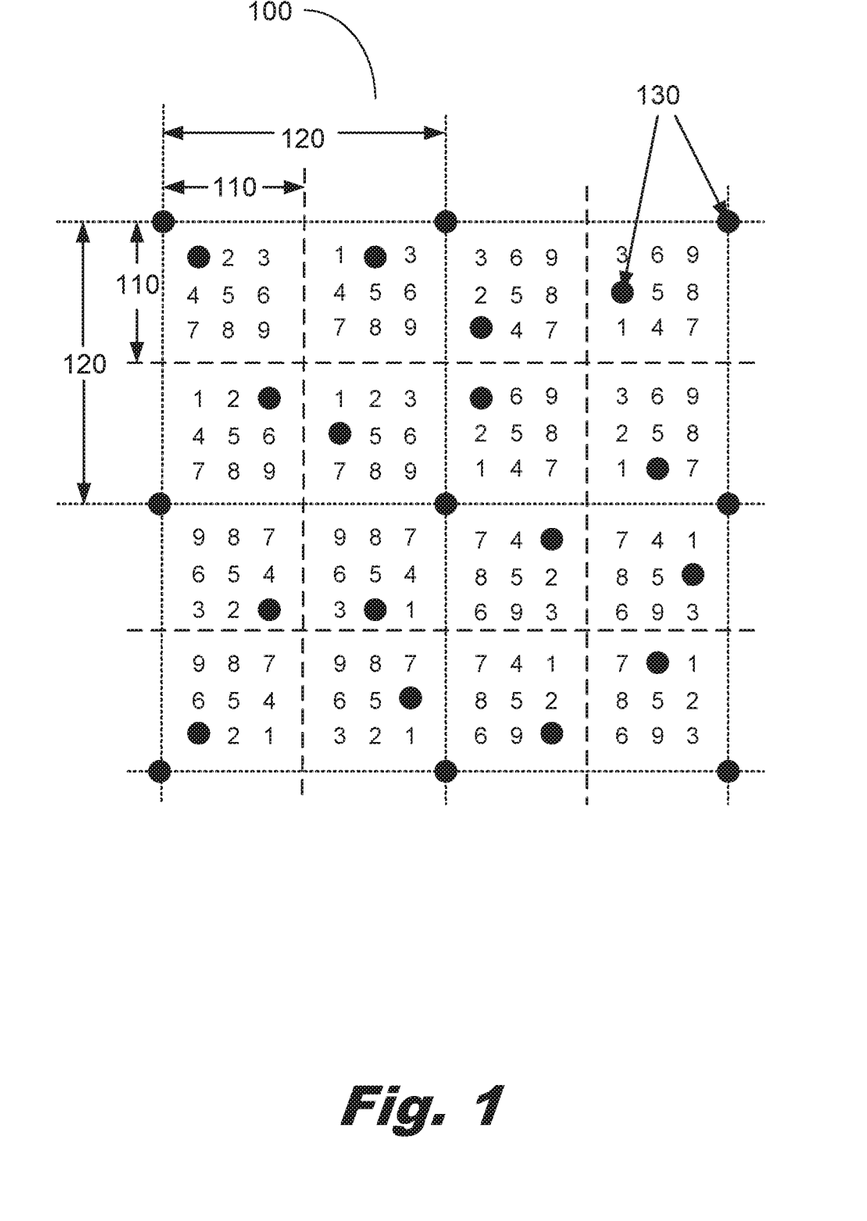
FIG. 1 shows a top view of an example of a surface consistent with the present specification.

Turning now to the claims, FIG. 1 shows a surface (100) including: multiple data pages (120), wherein each data page includes: multiple optically detectable marks (130) indicating boundaries of the data page (120) and an array of data cells (110); wherein a location of an optically detectable mark (130) in a data cell (110) of the array of data cells (110) encodes information and adjacent data pages (120) use different encoding patterns such that an encoded value would be represented by a first pattern of marks (130) on a first data page (120) and the same encoded value would be represented by a second, different pattern of marks (130) on a second data page (120).

The surface (100) may be any suitable surface to contain the encoded information. In an example, the surface is paper with the optically detectable marks (130) being ink marks. The ink may be deposited by a variety of printing processes. Office printers may have lower resolution, which is to say, may be capable of printing up to certain dots per inch (dpi) resolutions. Office printers allow implementation without additional hardware costs. Other printing processes with higher resolutions may be used.

The surface (100) may be an overlay. An overlay is a layer of material applied over and/or under another layer of material. An overlay may be a polymer film with an adhesive layer. An overlay may be silica and/or other material. An overlay may be applied after production to a monitor, tablet, display, writing surface, etc. An overlay may be incorporated into a display, for example, under the top surface of the display.

The surface (100) may be a display. The marks may be dynamically formed using pixels of the display. In an example, the marks facilitate determination of where the stylus tip is relative to a display. This implementation can be added without additional hardware on the part of the display. This implementation can be added to existing displays which provides savings over specifically designed equipment for use with the stylus.

The information in the surface is organized into data pages (120), Each data page (120) includes an array of data cells (110). Each data cell may be used to store a digit. Some data cells (110) may be reserved for parity operations, orientation marks, and/or other purposes. Organizing the data page into a set of data cells keeps the mark density on the surface more uniform which may reduce the visibility of the marks to a human eye. Organizing the data page into a set of data cells also allows ordering of the cells which increases the number of bits which can be stored for a given number of marks (130).

For example, 50 positions in data page (120) could be used with a single mark to provide 50 states; these states could indicate a number from 1 to 50. In contrast, breaking the 50 locations into five groups of 10, then we can use five marks to indicate numbers from 1 to 10^5, i.e., 100,000.

In addition to marks (130) used to indicate values stored in the data page, marks (130) may provide other functions. Multiple marks (130) are used to define the area and/or boundaries of the data page (120). Because the value of the data marks (130) depend on the position of the data mark (130) relative to the data page (120) and/or data cell (110), identifying boundaries of the data page (120) and/or data cell (110) precedes extracting information from the data marks (130).

In an example, page definition marks (130) are provided at each corner of the data page (120). Page definition marks (130) may be provided along the sides of the data page. Page definition marks (130) may provide orientation information for the data page (120). For example, one corner of may include a second reference mark (130) at one of the corners to indicate the orientation of the patterns on the surface (100). In an example, a corner with a different page definition mark (130) and/or pattern of page definition marks (130) may be considered the "top left" corner, defining the rotation that should be applied to an image of the surface to get the page oriented "right side up." These orientations are arbitrary and used to facilitate consistent processing.

The data page (120) includes an array of data cells (110). Each data cell (110) includes a number of positions. In an example, the positions form an array in the data cell (110). In some examples, a single position in the data cell (110) is occupied by a data mark (130). This position occupied by the data mark (130) indicates the value stored in the data cell (110). For example, if the data mark (130) was in position 4, then the value of the data cell is 4. The use of a data cell (110) with no data marks (130) may be used to indicate a value. In an example, the data cell (110) with no data marks (130) is used to indicate zero. A data cell (110) with no data marks (130) may be used to indicate one. In instances where the number being represented in the data page includes a large fraction of ones and/or zeros, the use of an empty data page, i.e., without a data mark (130), may reduce the number of data marks (130) on the surface (100). Reducing the number of data marks (130) on the surface (100) may reduce the calculation cost when orienting a captured image of the surface (100) and/or reduce the visual impact of the data marks (130).

A data page (120) may be square as shown in FIG. 1. A data page (120) may be other shapes, for example, rectangular. A data page (120) may be tessellated with adjacent rows and/or columns offset from each other. The data cells (110) in the array of data cells (110) may be square as shown in FIG. 1. The data cells (110) may be rectangular, for example, holding a 3×5 array of positions. The data cells (110) in a data page (120) may all be the same size and/or shape. A data page (120) may include multiple sizes and/or shapes of data cells (110). In an example, a data page (120) includes a first size data cell (110) for control information and a second size data cell for content information. A data cell (110) for control information may be a single position capable of holding a mark (130) and storing a bit of information. In an example, an edge of the data page (120) has a data cell (110) stretching along an edge of the data page (120).

The use of multiple optically detectable marks (130) in a single data cell (110) may be used to increase the number of states which may be stored in a given data cell (110). For example, if the data cell (110) contains a 3×3 array of positions, then a single data mark (130) may indicate values 1-9 and no data marks may indicate 0, providing ten possible states for the data cell (110). Allowing two data marks in the cell would allow the data cell (110) to indicate up to 36 additional unique states for a total of 46. However, this allows data marks (130) to be adjacent to each other which may increase the difficulty of extracting the positions of the data marks (130), especially when the stylus is tilted and/or rotated with respect to the surface (100). Allowing two data marks (130) per data cell also increases the density of data marks (130) on the surface, which makes the data marks (130) more apparent to a user. Accordingly, there are tradeoffs between information density and other factors which may be varied to suit the particular application.

The optically detectable marks (130) include a plurality of marks (130) indicating boundaries of the data page as well as data marks (130) in a position of a data cell (110) to indicate a value of the data cell (110). The value associated with the position occupied by the data mark (130) may be determined using the encoding pattern for that data cell (110).

Additional optically detectable marks (130) may be associated with a data page (120). In an example, the optically detectable marks (130) indicate an encoding pattern used in a data cell (110). The optically detectable marks (130) may provide orientation information. The optically detectable marks (130) may provide reference features to facilitate identification of the data page (120) in an image of the surface (100). Other optically detectable marks (130) may provide quality control, redundancy, and/or parity functions. Optically detectable marks (130) may be located on the perimeter of the data page (120), on the perimeter of a data cell (110) but internal to the data page (120), and/or within a data cell (110).

The optically detectable marks (130) may be provided with different shapes, colors, orientations, etc. to provide additional information. However, the marks may also be kept small and assessed on a present/absent basis without regard to the particular shape. The benefits and costs of varying the data marks (130) depend, in part, on the particular application. The use of marks (130) without shape, orientation, color, and/or other information may allow the use of smaller marks (130) and/or reduce the resolution demands of the optical sensor and/or camera used to capture an image of the surface (100). The use of present/absent marks (130) may also reduce the processing power to extract the information from the surface. Keeping the processor load low in a stylus may reduce the diameter of the stylus and/or impact the session time between recharging and/or battery replacement. Using a grey scale camera on the stylus rather than a color camera may speed processing, increase product robustness, and/or decrease costs.

The material of this disclosure may use shaped, colored, oriented, and/or other features of the marks (130) to increase the information stored per mark (130). The described material may also be implemented with present/absent marks (130).

In FIG. 1, the encoding pattern is changed between adjacent data pages (120). In the example of FIG. 1, the encoding pattern rotates 90 degrees between adjacent data pages (120). This allows encoding the same information without producing repetitive mark-to-mark spacing between the data pages (120). The arrays of number visible in the figures are to show the encoding pattern. The arrays of numbers do not appear on the surface (100). The pattern is formed with the marks (130) on the surface (100). Both control marks (130) and data marks (130) are present on the surface. Some marks (130) may function as both control marks (130) and data marks (130).

Figure 2:
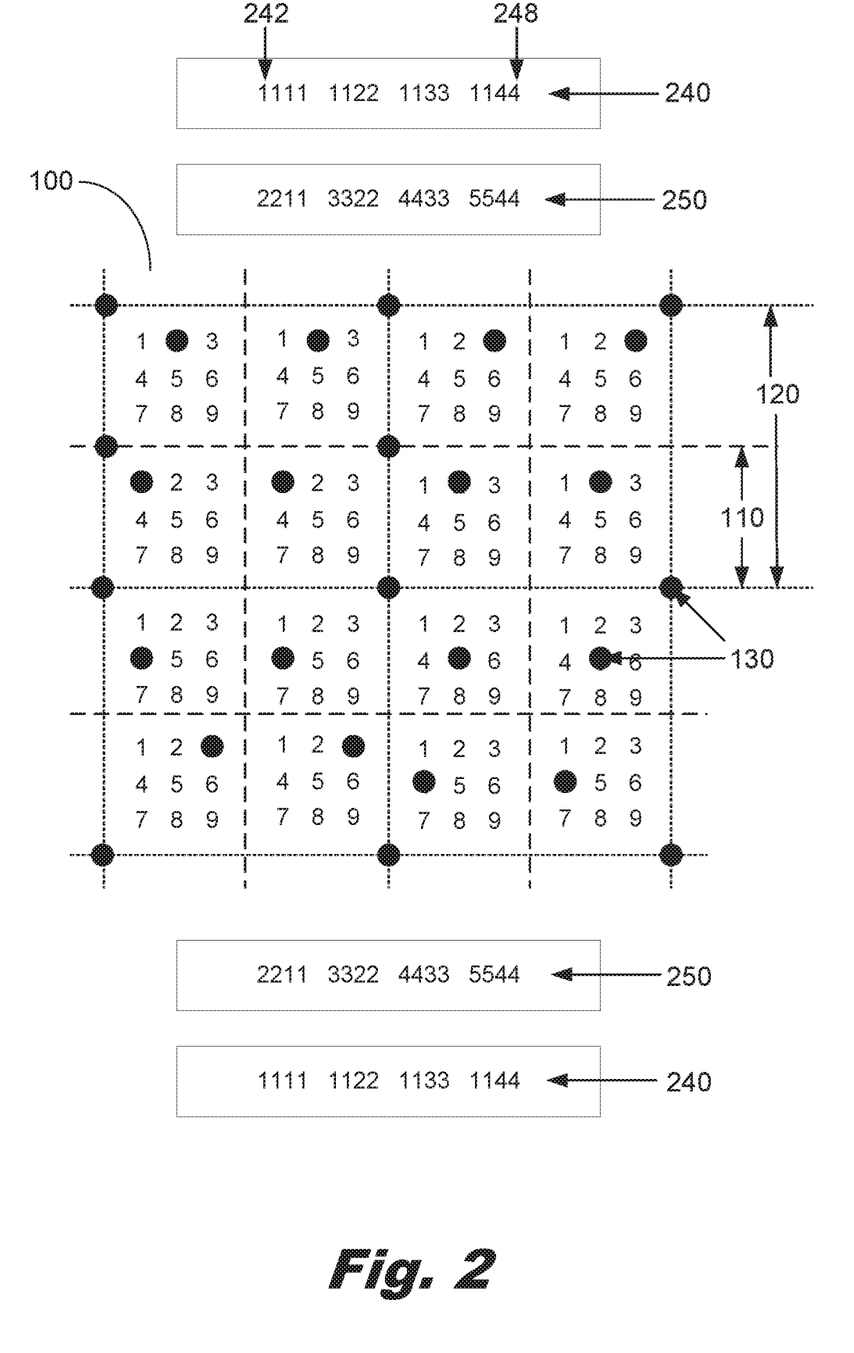
FIG. 2 shows a top view of an example of a surface consistent with the present specification.

FIG. 2 shows an example of a surface (100) consistent with the present specification. The surface (100) including: multiple data pages (120), each data page (120) encoding an encoded series of digits (240) having a most-significant digit (242) and a least-significant digit (248), each data page (120) including: multiple marks (130) indicating boundaries of the data page (120), and an array of data cells (110), each data cell (110) indicating a digit of a series of conjugate transformed digits (250) based on a position of a mark (130) relative to the data cell (110), wherein conjugate inverse-transforming the series of conjugate transformed digits (250) produces the encoded series of digits (240).

The encoded series of digits (240) is the information stored in the data page (120). The encoded series of digits (240) may include a document number, a page number, a row number, a column number, a password, an identifier, a webpage, an alt-text, and/or any number of other types of information a person might want to include on a surface. (120).

FIG. 2 shows a smaller number of data cells (110) per data page (120), specifically a 2×2 array of data cells (110) per data page (120), in order to show multiple full data pages (120) in the figure. Each data cell (110) may store a digit. Some data cells (110) and their associated digits may be reserved for control information, parity information, and/or other uses. A 2×2 array of data cells (110) in a data page (120) may store a four digit series of digits (240). A 5×5 array of data cells (110) in a data page (120) may store a twenty-five digit series of digits (240), The series of digits (240) may be shorter if data cells are reserved for other uses, e.g., parity, as described above.

The encoded series of digits (240) includes a most-significant digit (242) and a least-significant digit (248). In an example, the most-significant digit (242) is the leftmost digit when the series of digits (240) is displayed. The least-significant digit (248) may be the rightmost digit when the series of digits (240) is displayed. However, other possibilities may also be considered. The series of digits may be a concatenation of smaller numbers. For example, the series of digits may be the concatenation of X position (3 digits), Y position (3 digits), page number (3 digits), document number (14 digits), and parity (1 digit). In such a series of digits, the whole of the document number and the page number may be fixed over the entire surface (100). Accordingly, any of the digits making up the document number and/or page number may function as a most-significant digit (242) as their value does not change over the surface (100). Similarly, the least-significant digit (248), may be selected from the least-significant digit of the X position, Y position, and/or parity.

Some solutions described in this specification use variation of the encoding pattern to avoid repetition of the mark (130) positions from data page (120) to data page (120) to reduce fixed pattern noise. FIG. 2 uses conjugate transformation of the stored series of digits (240) to reduce fixed pattern noise. This allows the use of single encoding pattern on the surface (120), This also avoids the need to identify the encoding pattern before extracting the series of conjugate transformed digits from the marks (130) of the surface (100). This approach uses conjugate inverse-transformation of the conjugate transformed series of digits to obtain the encoded series of digits. The conjugate inverse-transformation operation may be a lookup and/or a modular arithmetic operation and so produces relatively little processor load. This is especially true as the decoding may be performed on the series of conjugate transformed digits rather than, for example, the image of the surface.

In an example, the conjugate transform is a modular addition of the least significant digit to the most significant digit. In an example, the conjugate transform is modular addition of the least significant digit to all other digits of the series of digits (240). In an example, the conjugate transform changes the first one, two, three, or more digits of the series of digits (240) while not transforming the least significant digit(s). The example shown in FIG. 2 adds the least significant digit to the two most significant digits to perform the conjugate transform. The conjugate inverse-transform of FIG. 2 is performed by subtracting the least significant digit from the two most significant digits.

Each data cell (110) indicates a conjugate transformed digit of the series of conjugate transformed digits (250), The data cell (110) indicates the conjugate transformed digit by the position of a data mark(s) (130) in the data cell (110). The absence of any data marks (130) in a data cell (110) may also be used to indicate a value. Similarly, combinations of multiple data marks (130) in a data cell may be used to indicate a value. The position of the mark (130) is compared against an encoding pattern which indicates the value associated with the data mark (130) at available positions in the data cell (110). In some example, the positions are arranged as an orderly array with the position values changing in an orderly fashion. In other encoding patterns, the values are effectively randomly distributed in the data cell (110).

Once the data mark (130) of a data cell (110) has been assessed, the value associated with that data cell may be assigned to a digit in a series of conjugate transformed digits. The array of data cells (110) in a data page (120) has an order associated with the respective data cells (110). In an example, the array is read from left to right by row, the way one reads English text. Any suitable pattern may be used and some patterns may be disorderly without impacting the functionality. After the value for each of the data cells (110) is determined, the digits are arranged based on the order of the data cells (110) to form a series of conjugate transformed digits (250).

The series of conjugate transformed digits (250) is then conjugate inverse-transformed into a series of encoded digits (240) which represent the value stored in the surface. The conjugate inverse-transformation operation may have a definitive result for each series of conjugate transformed digits. Two different conjugate transformed series of digits may both produce a same result. For example, there may be multiple ways to encode a number so as to provide options on data mark (130) position in a data cell (110).

In an example, the conjugate inverse-transformation is a modular arithmetic operation. The modular arithmetic operation may use the value of a least-significant digit, a parity digit, a code digit, and/or other value which varies from data page (120) to data page (120) to produce the variation in the data marks (130) representing values which remain the same on the different data pages (120).

In an example, the conjugate inverse-transformation is subtraction of a least-significant digit from each of the other digits, where the subtraction is performed in as a modulus operation of a base equal to the number of potential states for the digit. For example, if data cells each had 16 potential single data mark states, such as a 4×4 array of positions, we could represent them a hexadecimal numbers. If the data page had a 2×2 array of data cells then there would be four digits. After consulting the encoding pattern for the data cells, the values of the four data cells are D827 in an example. Performing the example conjugate inverse-transformation of a modular subtraction of 7 from each of the digits other than the least-significant digit yields (D-7)(8-7)(2-7)(7), which simplifies to 61B7, which is the encoded series of digits.

Other functions for the conjugate inverse-transformation of the conjugate transformed data may be used. The use of a modular addition and/or subtraction based on a variable digit is an effective method to produce different spacing between data marks (130) and reduce fixed pattern noise when the data pages (120) repeat regions of the encoded series of digits (240). The value used for the conjugate transformation operation may be used for other information purposes, such as the least-significant digit of a coordinate. The value used for the conjugate transformation operation may contain no other information but may occupy a fixed position in the series of digits.

Figure 3:
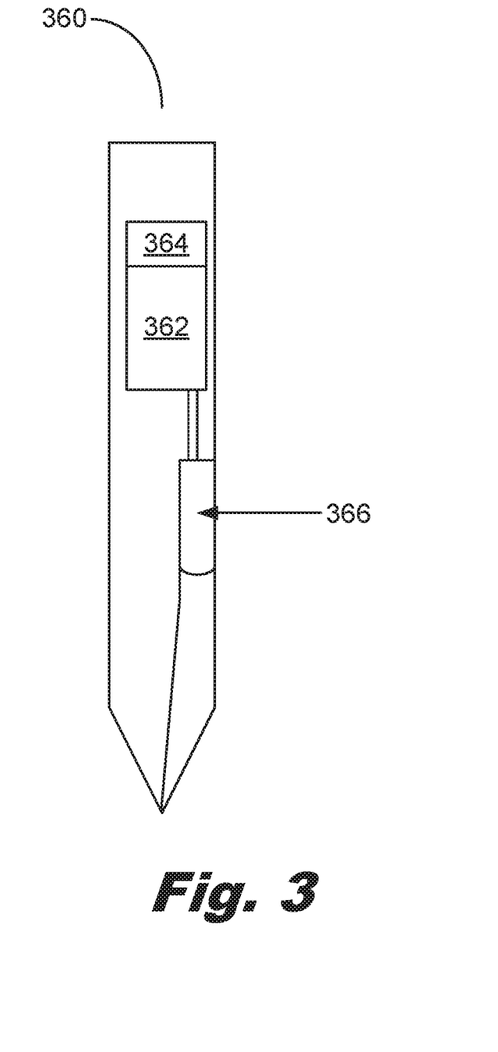
FIG. 3 shows an example of a stylus consistent with the present specification.
Figure 4:
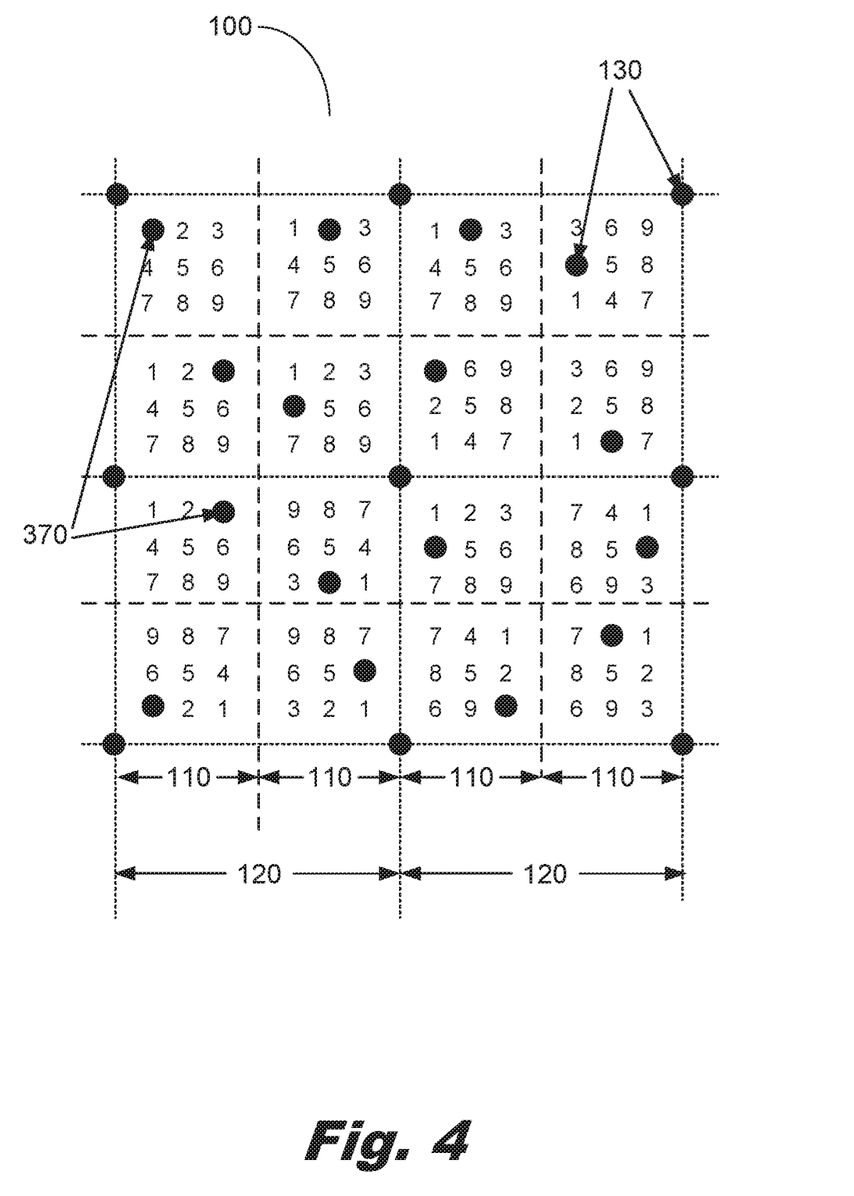
FIG. 4 shows a top view of an example of a surface consistent with the present specification.

FIG. 3 shows an example of a stylus (360) according to an example consistent with the present specification. The stylus (360) includes: a processor (362); a memory (364) associatively coupled with the processor (362); and a camera (366) directed to a surface beneath a tip of the stylus, wherein, when processing instructions in the memory (364), the processor (362): receives an image's of a surface (100) from the camera/s (366); determines a location of a data page (120) in the image/s; determines a value of a code (370) based on a position of an optically detectable mark (130) relative to the data page (120); and determines the values of data cells (110) in the data page (120) based on the value of the code (370) and positions of optically detectable marks (130) on the data page (120). An example of such a surface (100) is shown in FIG. 4.

The stylus (360) includes a processor (362) and an associated memory (364). The processor and associated memory may be located within the stylus. In an example; the stylus may perform the image capture and transmission while using an external processor to perform the image processing and data extraction. The stylus (360) includes a camera's (366). The camera/s (366) is oriented to capture an image/s of the area distal to the tip of the stylus (260), i.e., where a user is pointing the stylus. The image/s of the surface (100) is then processed by the processor (362) using the instructions from the memory (364) to extract the information encoded with the marks (130) on the surface (100)

The code (370) is a value used to determine the encoding pattern used for a portion of a data page. The code (370) may be indicated by a mark (130). The mark (130) indicating the code (370) may serve another purpose as well. The mark (130) indicating the code (370) may serve to define the position and/or orientation of the data page (120). The mark (130) indicating the code (370) may also provide parity information. The mark indicating the code (370) may contain position information. The mark (130) indicating the code (370) may indicate page and/or document information.

The stylus (360) may include multiple cameras (366). The multiple cameras (366) may acquire overlapping images of the surface (100). The use of multiple cameras (366) in fixed relation to each other may increase resolution of the marks (130). The use of multiple cameras (366) in fixed relation to each other may facilitate making absolute measurements of distances rather than relative distances from the images. The use of multiple cameras (366) may be useful to deal with rotation and/or tilt compensation. The use of a single camera (366) may occupy less space in the stylus (360). In an example, the stylus (360) includes multiple cameras (366) but may operate in a single camera (366) mode or in a binocular mode using both cameras (366). In an example, the stylus (360) adjusts mode based on orientation of the stylus (360) relative to the surface (100). The stylus (360) may adjust mode based on ambient lighting and/or other conditions. The stylus (360) may adjust mode based on detecting a failure in a camera (366). The stylus (360) may adjust mode based on available power and/or a power use profile.

FIG. 4 shows an example of a surface (100) consistent with the present specification. The surface shows four data pages (120), each data page (120) containing four data cells (110). In each data page (120), one of the data cells (110) uses a first encoding pattern. This data cell is identifiable based on the data page (120). For example, the bottom right corner data cell (110) could be used. A center data cell (110) may be used. The designated data cell could have a different position in each data page (120) and be indicate by a mark (130), for example, in the middle of the top edge of the data cell (110).

The data cell (110) which uses the first encoding may be identified and the value extracted based on knowledge of the first encoding pattern. The first encoding pattern is the same for all the data pages (120) on the surface (100). Fixed pattern noise may be reduced by varying the code (370) stored in the data cell which uses the first encoding and/or selecting a digit that naturally varies between different data pages.

After the code (370) is determined from the data cell (10) which uses the first encoding, the value of the code is used to determine the encoding pattern(s) of the other data cells (110) in the data page (120). Based on the value of the code (270) the values other data cells (110) may be determined and the values organized into an encoded series of digits based on an order of the data cells (110).

A single data cell (110) may provide, for example: 9, 10, 16, 17, or another number of states to define different encoding patterns for the other data cells (110) of the data page (120), In an example, two data cells (110) are used with the first encoding to provide many more possible encoding patterns. For example, 9^2 or 81. Similarly, three data cells (110) could be used, for 9^3 or 729 possible encoding patterns. Data cells (110) containing digits that vary are more useful to prevent repetition and patterns in the data marks (130) on the surface (100). For example, the least-significant X position and least-significant Y position data cells may be used. Parity digits and/or bits are another variable digit. Dedicated digits may also be used.

Within the principles described by this specification, a vast number of variations exist. The examples described are examples, and are not intended to limit the scope, applicability, and/or construction of the claims in any way.

What is claimed is:

1. A surface comprising:
    multiple data pages, wherein each data page comprises:
        multiple optically detectable marks indicating boundaries of the data page; and
        an array of data cells, wherein a location of an optically detectable mark in a data cell of the array of data cells encodes information and adjacent data pages use different encoding patterns such that an encoded value would be represented by a first pattern of marks on a first data page and the same encoded value would be represented by a second, different pattern of marks on a second data page.

2. The surface of claim 1, wherein an encoding pattern applied to a second data page excludes some states based on the positions of optically detectable marks in a first data page.

3. The surface of claim 1, wherein the encoding pattern is rotated by an increment of 90 degrees between adjacent data pages.

4. The surface of claim 3, wherein data pages are rotated in a pattern on the surface.

5. The surface of claim 1, wherein the encoding pattern for the optically detectable marks depends on a least-significant bit of the encoded information.

6. The surface of claim 1, wherein the surface comprises multiple layers, the optically detectable marks being disposed on an overlay layer that is paired with another layer of material.

7. The surface of claim 1, wherein some of the optically detectable marks function as both control marks and data marks.

8. A surface comprising:
    multiple data pages, each data page encoding an encoded series of digits having a most-significant digit and a least-significant digit, each data page comprising:
        multiple marks indicating boundaries of the data page, and
        an array of data cells, each data cells indicating a digit of a series of conjugate transformed digits based on a position of a mark relative to the data cell,
        wherein conjugate inverse-transforming the series of conjugate transformed digits produces the encoded series of digits.

9. The surface of claim 8 wherein conjugate inverse-transforming the most-significant digit of the series of digits combines the most-significant conjugate transformed digit and the least-significant conjugate transformed digit.

10. The surface of claim 8, wherein conjugate inverse-transforming each digit of the series of digits combines a respective digit of the series of conjugate transformed digits and the least-significant digit of the series of conjugate transformed digits.

11. The surface of claim 8, wherein the series of digits comprise an X position and a Y position.

12. The surface of claim 8, wherein the series of digits comprises a document identification number.

13. The surface of claim 8, wherein the series of digits comprises a document page number.

14. A stylus, wherein the stylus comprises:
    a processor;
    a memory associatively coupled with the processor; and
    a camera directed to a surface beneath a tip of the stylus,
        wherein, when processing instructions in the memory, the processor:
            receives an image of a surface from the camera;
            determines a location of a data page in the image;
            determines a value of a code based on a position of an optically detectable mark relative to the data page; and
            determines the values of data cells in the data page based on the value of the code and positions of optically detectable marks on the data page, wherein the processor further determines that adjacent data pages use different encoding patterns such that an encoded value would be represented by a first pattern of marks on a first data page and the same encoded value would be represented by a second, different pattern of marks on a second data page.

15. The pen of claim 14, wherein the code is a least-significant digit for a value encoded in the surface.

16. The pen of claim 14, wherein the code functions as a parity bit.

17. The pen of claim 14, wherein the code is contained in two code-containing data cells, the first code containing data cell containing the least-significant digit of an X position and the second code containing data cell containing the least-significant digit of a Y position.

18. The pen of claim 14, wherein the processor is to further determine when an encoding pattern applied to a second data page excludes some states based on positions of optically detectable marks in a first data page.

19. The pen of claim 14, wherein the processor is to further to recognize that the encoding pattern is rotated by an increment of 90 degrees between adjacent data pages adjacent.

20. The pen of claim 14, wherein the processor is further to recognize that the encoding pattern for each of a series of data pages is rotated by an increment in a pattern over the surface.

\* \* \* \* \*